United States Patent
Zhang et al.

(10) Patent No.: US 9,747,845 B2
(45) Date of Patent: Aug. 29, 2017

(54) BACKLIGHT CONTROL CIRCUIT, ELECTRONIC DEVICE AND DISPLAY PANEL DRIVING METHOD

(71) Applicant: SHENZHEN CHINA STAR OPTOELECTRONICS TECHNOLOGY CO., LTD., Shenzhen, Guangdong (CN)

(72) Inventors: Hua Zhang, Guangdong (CN); Xianming Zhang, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/413,150

(22) PCT Filed: Jan. 17, 2014

(86) PCT No.: PCT/CN2014/070791
§ 371 (c)(1),
(2) Date: Jan. 6, 2015

(87) PCT Pub. No.: WO2015/089926
PCT Pub. Date: Jun. 25, 2015

(65) Prior Publication Data
US 2016/0284282 A1    Sep. 29, 2016

(30) Foreign Application Priority Data
Dec. 17, 2013    (CN) .......................... 2013 1 0695307

(51) Int. Cl.
*G09G 3/36* (2006.01)
*G09G 3/34* (2006.01)
(Continued)

(52) U.S. Cl.
CPC ........... *G09G 3/3413* (2013.01); *G09G 3/003* (2013.01); *G09G 3/3406* (2013.01); *H04N 13/04* (2013.01);
(Continued)

(58) Field of Classification Search
None
See application file for complete search history.

(56) References Cited

U.S. PATENT DOCUMENTS

| 2011/0090233 A1 | 4/2011 | Shahraray et al. |
| 2011/0157260 A1* | 6/2011 | Pyun ................ G02B 27/2264 345/691 |
| 2011/0227503 A1* | 9/2011 | Yuan ................... G09G 3/3406 315/294 |

FOREIGN PATENT DOCUMENTS

| CN | 101697595 A | 4/2010 |
| CN | 101937147 A | 1/2011 |

(Continued)

OTHER PUBLICATIONS

Chao Wang, the International Searching Authority written comments, Sep. 2014, CN.

*Primary Examiner* — Joseph Haley (57) ABSTRACT

A display panel driving method for driving a LED module of an electronic device to emit light, the method includes steps: controlling to scan a left-eye image and a right-eye image when the electronic device works at a 3D mode (S401); controlling the LED module to turn off and does not emits light during a predetermined period less than a scanning time of the left-eye image or the right-eye image, after switching to scan the left-eye image and the right-eye image (S402); and controlling the LED module to turn on and emit light after the predetermined period has passed (S403). The present invention also provides a backlight control circuit and an electronic device, the present invention capable of (Continued)

controlling the backlight module to emit light via the same signal and do not cause the interference between different signals.

11 Claims, 3 Drawing Sheets

(51) Int. Cl.
*H05B 33/08* (2006.01)
*H05B 37/02* (2006.01)
*H04N 13/04* (2006.01)
*G09G 3/00* (2006.01)

(52) U.S. Cl.
CPC ....... *H05B 33/0827* (2013.01); *H05B 37/029* (2013.01); *G09G 2310/0237* (2013.01); *G09G 2320/0209* (2013.01)

(56) References Cited

FOREIGN PATENT DOCUMENTS

| | | |
|---|---|---|
| CN | 102117608 A | 7/2011 |
| CN | 102163407 A | 8/2011 |
| CN | 102163408 A | 8/2011 |
| CN | 103198799 A | 7/2013 |
| CN | 103280192 A | 9/2013 |
| WO | WO2012147663 A1 | 11/2012 |

* cited by examiner

BACKLIGHT CONTROL CIRCUIT, ELECTRONIC DEVICE AND DISPLAY PANEL DRIVING METHOD

FIELD OF THE INVENTION

The present invention relates to a controlling circuit, and more particularly, to a backlight controlling circuit and an electronic device with the backlight control circuit, and a display panel driving method.

BACKGROUND OF THE INVENTION

Nowadays, more and more electronic devices use light-emitting diodes (LEDs) as a backlight module. In general electronic devices, such as televisions, computer displays can work at a two-dimensional (2D) mode or a three-dimensional (3D) mode. When the electronic device is worked at the 3D mode, it is need to scan a left-eye image and a right-eye image in sequence, and the duration to scan the left-eye image and the right-eye image are both the same. In a general 3D mode scanning method, one image is divided into a number of portions and then the portions are respectively be scanned, and the backlight module usually includes a number of LED strings, after one portion of the picture is scanned, one LED strings corresponding to the portion is turned on to emit light. Therefore, backlight controlling signals outputting to the LED strings corresponding to the portions of the picture are different signals which are delayed in sequence. However, in order to output the backlight controlling signals to the LED strings corresponding to different portions, there is need to prepare a number of signal lines, which causes the circuit is complex and the signal lines are easy to interfere each other.

SUMMARY OF THE INVENTION

The present invention provides a backlight control circuit, an electronic device and a display panel driving method, which can control the backlight module via one signal line, and then eliminate the interference between a number of signal lines.

A backlight control circuit, configured to drive a light-emitting diode (LED) module of an electronic device to emit light, comprising a time schedule controller and a LED driving unit, the time schedule controller comprises a display signal output pin, the time schedule controller outputs image signals with a first frequency to a display screen via the display signal output pin to execute a scanning for an image, thus driving the display screen to display the corresponding image, wherein, the time schedule controller further comprises a backlight control pin, the backlight control pin is connected to the LED module; therein, when the electronic device is worked at a 3 three-dimensional (3D) mode, and when the time schedule controller switches scanning a left-eye image and a right-eye image, the time schedule controller controls the backlight control pin to output a backlight control signal with a first voltage to the LED module to control the LED module to turn off and does not emits light during a predetermined period less than a scanning time of the left-eye image or the right-eye image; the time schedule controller further controls the backlight control pin to output a backlight control signal with a second voltage to the LED module to control the LED module to turn on and emit light until the scanning time of the left-eye image or the right-eye image is finished, after the predetermined period has passed.

Therein, when the electronic device works at the 3D mode, the time schedule controller controls a scanning frequency for scanning the left-eye image or the right-eye image to be a second frequency which is N times the first frequency, thus the left-eye image or the right-eye image would be scanned N times reputedly during the scanning time of the left-eye image or the right-eye image; the time schedule controller outputs the backlight control signal with the first voltage to the LED module to control the LED module to turn off and not to emit light during a period of the left-eye image or the right-eye image is scanned M times which is less than the N times, and then outputs the backlight control signal with the second voltage to the LED module to control the LED module to turn on and emit light after the left-eye image or the right-eye image has been scanned M times, until the scanning time of the left-eye image or the right-eye image is finished.

Therein, the time schedule controller controls the scanning frequency for scanning the left-eye image or the right-eye image to be the first frequency, the time schedule controller outputs the backlight control signal with the first voltage to control the LED module to turn off and not to emit light during the predetermined period less than the scanning time, from starting scan the left-eye image or the right-eye image; the time schedule controller then outputs the backlight control signal with the second voltage to control the LED module to turn on and emit light after the left-eye image or the right-eye image has been scanned the predetermined period, until the scanning time of the left-eye image or the right-eye image is finished.

Therein, the LED module comprises an anode input port and a plurality of LED strings connected between the anode input port and ground in parallel, each LED string comprises several LEDs and a metal oxide semiconductor field effect transistor (MOSFET) connected between the anode input port and ground in series, the backlight control pin is connected to a drain of the MOSFET of each LED string, the time schedule controller controls the backlight control pin to output the backlight control signal with the first voltage to control the MOSFET of all of the LED strings to turn off, thus the LED module does not emit light; the time schedule controller further controls the backlight control pin to output the backlight control signal with the second voltage to the MOSFET of all of the LED strings to turn on all of the LED strings, thus the LED module emits light.

Therein, control time sequences of all of the LEDs of the LED module are the same.

An electronic device, comprising a light-emitting diode (LED) module, a display screen, and a backlight control circuit, the backlight control circuit is configured to drive a light-emitting diode (LED) module of an electronic device to emit light, comprising a time schedule controller and a LED driving unit, the time schedule controller comprises a display signal output pin, the time schedule controller outputs image signals with a first frequency to a display screen via the display signal output pin to execute a scanning for an image, thus driving the display screen to display the corresponding image, wherein, the time schedule controller further comprises a backlight control pin, the backlight control pin is connected to the LED module; therein, when the electronic device is worked at a three-dimensional (3D) mode, and when the time schedule controller switches scanning a left-eye image and a right-eye image, the time schedule controller controls the backlight control pin to output a backlight control signal with a first voltage to the LED module to control the LED module to turn off and does not emits light during a predetermined period less than a scanning time of the left-eye image or the right-eye image; the time schedule controller further controls the backlight control pin to output a backlight control signal with a second voltage to the LED module to control the LED module to turn on and emit light until the scanning time of the left-eye image or the right-eye image is finished, after the predetermined period has passed.

Therein, when the electronic device works at the 3D mode, the time schedule controller controls a scanning frequency for scanning the left-eye image or the right-eye image to be a second frequency which is N times the first frequency, thus the left-eye image or the right-eye image would be scanned N times reputedly during the scanning time of the left-eye image or the right-eye image; the time schedule controller outputs the backlight control signal with the first voltage to the LED module to control the LED module to turn off and not to emit light during a period of the left-eye image or the right-eye image is scanned M times which is less than the N times, and then outputs the backlight control signal with the second voltage to the LED module to control the LED module to turn on and emit light after the left-eye image or the right-eye image has been scanned M times, until the scanning time of the left-eye image or the right-eye image is finished.

Therein, the time schedule controller controls the scanning frequency for scanning the left-eye image or the right-eye image to be the first frequency, the time schedule controller outputs the backlight control signal with the first voltage to control the LED module to turn off and not to emit light during the predetermined period less than the scanning time, from starting scan the left-eye image or the right-eye image; the time schedule controller then outputs the backlight control signal with the second voltage to control the LED module to turn on and emit light after the left-eye image or the right-eye image has been scanned the predetermined period, until the scanning time of the left-eye image or the right-eye image is finished.

Therein, the LED module comprises an anode input port and a plurality of LED strings connected between the anode input port and ground in parallel, each LED string comprises several LEDs and a metal oxide semiconductor field effect transistor (MOSFET) connected between the anode input port and ground in series, the backlight control pin is connected to a drain of the MOSFET of each LED string, the time schedule controller controls the backlight control pin to output the backlight control signal with the first voltage to control the MOSFET of all of the LED strings to turn off, thus the LED module does not emit light; the time schedule controller further controls the backlight control pin to output the backlight control signal with the second voltage to the MOSFET of all of the LED strings to turn on all of the LED strings, thus the LED module emits light.

An display panel driving method, configured to drive a LED module of an electronic device to emit light and control a display screen of the electronic device to scan a left-eye image and a right-eye image, when the electronic device works at a three-dimensional (3D) mode, wherein the method comprising: controlling the LED module to turn off and does not emits light during a predetermined period less than a scanning time of the left-eye image or the right-eye image, after switching to scan the left-eye image and the right-eye image; and controlling the LED module to turn on and emit light after the predetermined period has passed.

Therein, control time sequences of all of the LEDs of the LED module are the same.

Therein, the step of "controlling the LED module to turn on and emit light after the predetermined period has passed" comprises: controlling a scanning frequency for scanning the left-eye image or the right-eye image to be N times a scanning frequency of the 2D mode; scanning the left-eye image or the right-eye image N times reputedly during the scanning time of the left-eye image or the right-eye image; and controlling the LED module to turn on and emit light until the scanning time of the left-eye image or the right-eye image is finished, after the left-eye image or the right-eye image has been scanned M times.

Therein, the step of "controlling the LED module to turn on and emit light after the predetermined period has passed" comprises: controlling a scanning frequency for scanning the left-eye image or the right-eye image to be a scanning frequency of the 2D mode; and controlling the LED module to turn on and emit light after the left-eye image or the right-eye image has been scanned the predetermined period, until the left-eye image or the right-eye image has been scanned the scanning time.

The backlight control circuit, an electronic device and a display panel driving method of the present invention capable of controlling the backlight module to emit light via the same signal and do not cause the interference between different signals.

DETAILED DESCRIPTION OF THE PREFERRED EMBODIMENTS

Figure 1:
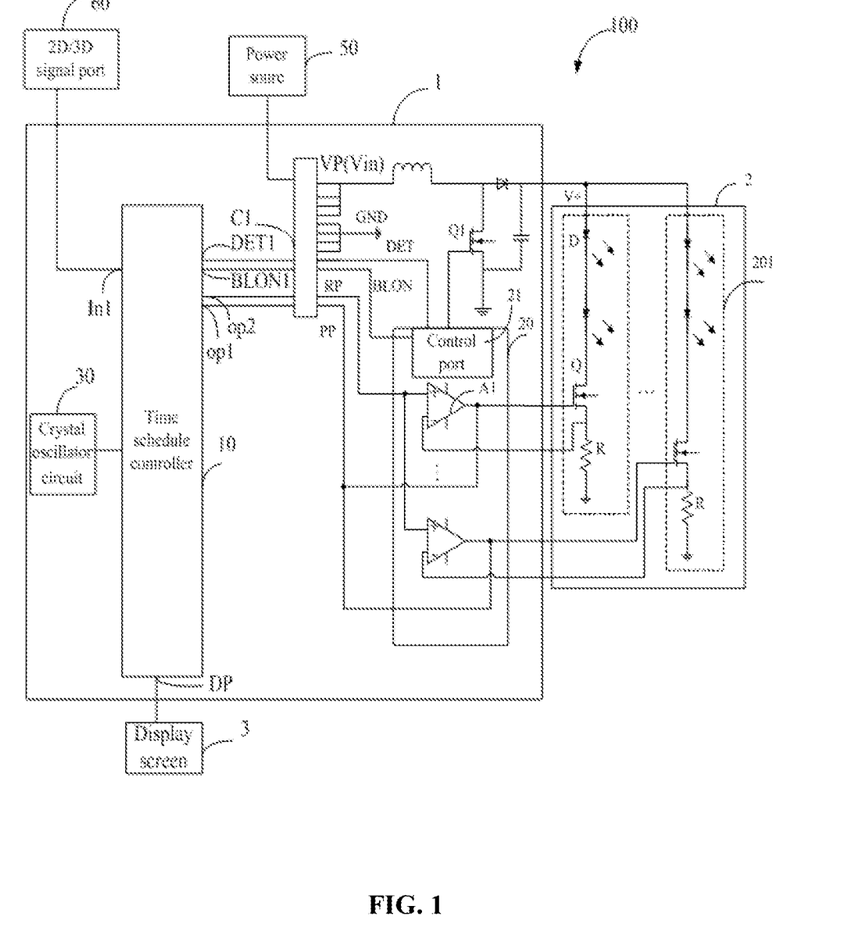
FIG. 1 illustrates a circuit diagram of an electronic device with a backlight control circuit of an embodiment.
Figure 2:
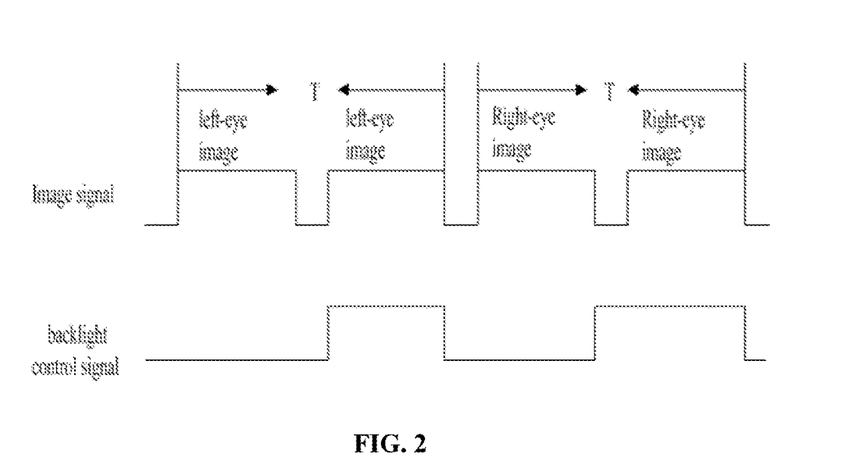
FIG. 2 illustrates a diagram of a time sequence of a backlight control signal output by a time schedule controller of a backlight control circuit of a first embodiment.

Referring to FIGS. 1 and 2 together, FIG. 1 illustrates a circuit diagram of an electronic device 100 with a backlight control circuit 1 of the present invention. The electronic device 100 includes the backlight control circuit 1, a light-emitting diode (LED) module 2, and a display screen 3. The backlight control circuit 1 is used to drive the light-emitting diode (LED) module 2 to emit light. Therein, the LED module 2 includes an anode input port V+ and a number of LED strings 201 connected between the anode input port V+ and ground in parallel, each LED string 201 includes several LEDs D, a metal oxide semiconductor field effect transistor (MOSFET) Q, and a resistor R which are connected in series.

The backlight control circuit 1 includes a time schedule controller 10 and a LED driving unit 20. The time schedule controller 10 includes a display signal output pin DP, the time schedule controller 10 outputs image signals with a corresponding frequency to the display screen 3 via the display signal output pin DP to execute a scanning for an image, thus driving the display screen 3 to display the corresponding image.

The time schedule controller 10 also includes a backlight control pin opt, the backlight control pin op1 is connected to the LED module 2 and is used to produce backlight control signals to turn on or off the whole LED module 2. Therein, when the electronic device is worked at a 3 three-dimensional (3D) mode, when the time schedule controller 10 controls to switch between scanning a left-eye image and a right-eye image, namely, the time schedule controller 10 controls the image signals output by the display signal output pin DP to switch from the left-eye image signal to the right-eye image signal or from the right-eye image signal to the left-eye image signal, the time schedule controller 10 controls the backlight control pin op1 to output a backlight control signal with a first voltage to the LED module 2 to control the LED module to turn off and does not emits light during a predetermined period less than a scanning time T of the left-eye image or the right-eye image. The time schedule controller 10 also controls the backlight control pin op1 to output a backlight control signal with a second voltage to the LED module to control the LED module to turn on and emit light until the scanning time T of the left-eye image or the right-eye image is finished, after the predetermined period has passed.

The time when switching between scanning the left-eye image and the right-eye image is the time when beginning to scan the left-eye image or the right-eye image.

Therein, the electronic device 100 can work at a two-dimensional (2D) mode and the 3D mode, when the electronic device 10 works at the 2D mode, the time schedule controller 10 controls the display signal output pin DP to output image signals with a first frequency to the display screen 3 and drive the display screen 3 to display. When the electronic device 10 works at the 3D mode, the time schedule controller 10 controls to scan the left-eye image and the right-eye image in sequence, and a duration to scan the left-eye image or the right-eye image is the scanning time T.

As shown in FIG. 2, in a first embodiment, when the electronic device 100 works at the 3D mode, the time schedule controller 10 controls a scanning frequency for scanning the left-eye image or the right-eye image to be a second frequency, therein, the second frequency is N times the first frequency, thus the left-eye image or the right-eye image would be scanned N times reputedly during the scanning time T of the left-eye image or the right-eye image. The time schedule controller 10 then outputs the backlight control signal with the first voltage to the LED module 2 to control the LED module 2 to turn off and not to emit light during a period of the left-eye image or the right-eye image is scanned M times which is less than the N times. The time schedule controller 10 also outputs the backlight control signal with the second voltage to the LED module 2 to control the LED module 2 to turn on and emit light after the left-eye image or the right-eye image has been scanned M times, until the left-eye image or the right-eye image has been scanned N times, namely, until the scanning time T of the left-eye image or the right-eye image is finished.

In detail, the numerals N and M both are natural number, for example, as shown in FIG. 2, N is 2 and M is 1. Of course, N can be 4, 8, and other natural number, and M can be any natural number less than N.

Therein, as shown in FIG. 1, in the first embodiment, the backlight control circuit also includes a crystal oscillator circuit 30, the crystal oscillator circuit 30 is used to produce clock signals with corresponding frequencies, the time schedule controller 10 receives one clock signal with the corresponding frequency and produces the image signal with the same frequency.

In detail, the crystal oscillator circuit 30 is used to produce a clock signal with the first frequency or with the second frequency. In the first embodiment, the crystal oscillator circuit 30 includes a number of crystal oscillators (not shown) respectively used to produce a clock signal with a different frequency. The time schedule controller 10 receives the clock signal with the first frequency when the electronic device 100 is worked at the 2D mode, then controls to output the image signal with the first frequency to the display screen 3 to scan the image, thus to control the display screen 3 to display the corresponding image. The time schedule controller 10 receives the clock signal with the second frequency when the electronic device 100 is worked at the 3D mode, then controls to output the image signal with the second frequency to the display screen 3 to scan the left-eye image or the right-eye image, thus controlling the display screen 3 to display the corresponding image. In another embodiment, the crystal oscillator circuit 30 can only output the clock signal with the first frequency or the second frequency according to the electronic device 100 is worked at the 2D mode or the 3D mode.

Figure 3:
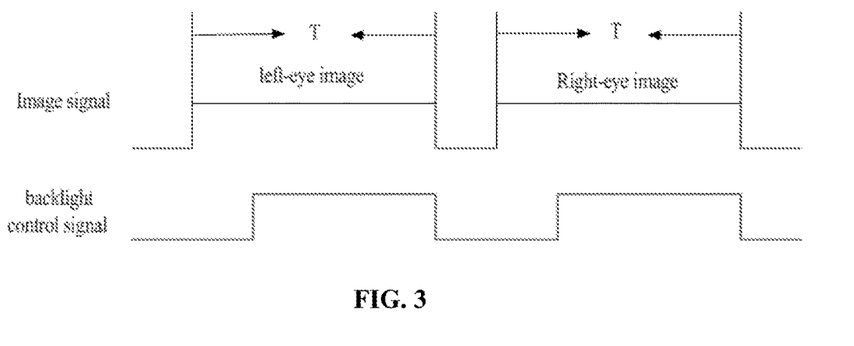
FIG. 3 illustrates a diagram of a time sequence of a backlight control signal output by a time schedule controller of a backlight control circuit of a second embodiment.

Referring also to FIG. 3, in a second embodiment, the time schedule controller 10 controls the scanning frequency for scanning the left-eye image or the right-eye image to be the first frequency, when the electronic device 100 works at the 3D mode. Namely, the scanning frequency of the 3D mode is the same as that of the 2D mode. The time schedule controller 10 outputs the backlight control signal with the first voltage to control the LED module 2 to turn off and not to emit light during the predetermined period less than the scanning time T, from starting scan the left-eye image or the right-eye image. The time schedule controller 10 then outputs the backlight control signal with the second voltage to control the LED module 2 to turn on and emit light after the left-eye image or the right-eye image has been scanned the predetermined period, until the left-eye image or the right-eye image has been scanned the scanning time T, namely until the scanning time T of the left-eye image or the right-eye image is finished.

In detail, in the first embodiment and the second embodiment of the present disclosure, the backlight control pin op1 is connected to a drain of the MOSFET Q of each LED string 201. Therein, the time schedule controller 10 controls the backlight control pin op1 to output the backlight control signal with the second voltage to the LED module 2 to control the LED module 2 to turn on is: output the backlight control signal with the second voltage to the drain of the MOSFET Q of each LED string 201 to turn on circuit loops of all of the LED string 201, then control the LED module 3 to turn on and emit light.

In more detail, the MOSFET Q of each LED string 201 is a N-channel MOSFET, the first voltage is a digital low voltage and the second voltage is a digital high voltage. Of course, the MOSFET Q of each LED string 201 also can be a P-channel MOSFET, and the first voltage is a digital high voltage and the second voltage is a digital low voltage correspondly.

Therein, as shown in FIG. 1, the backlight control circuit 1 also includes a connection port C1, the connection port C1 includes a power pin VP, a ground pin GND, and a control pin PP. The power pin VP is used to connect to a power source 50 to obtain a power voltage Vin, the power pin VP is connected to the anode input port V+ of the LED module 2 and provides the power voltage Vin to the LED module 2. The ground pin GND is grounded.

The backlight control pin op1 is connected to the control pin PP of the connection port C1, and then is electrically connected to the drain of the MOSFET Q of each LED string 201 via the control pin PP.

In the embodiment, because the backlight control signal is used to control the whole LED module 2, then the time schedule controller 10 only needs to output a single backlight control signal, namely, there is only one signal line is needed.

In the embodiment, the time schedule controller 10 also includes a 2D/3D signal input pin In1, the 2D/3D signal input pin In1 is connected to a 2D/3D signal port 60, and is used to receive a 2D signal or a 3D signal produced by the 2D/3D signal port 60. Therein, the 2D/3D signal port 60 respectively produces the 2D signal or the 3D signal when the electronic device works at the 2D module or the 3D module. In one embodiment, the 2D/3D signal port 60 can be a pin of a central processing unit (not shown), the central processing unit outputs the 2D signal or the 3D signal via the 2D/3D signal port 60 according to the mode of the electronic device 100.

In the first embodiment, the time schedule controller 10 selects to receive the clock signal with the first frequency or the clock signal with the second frequency from the crystal oscillator circuit 30 according to the signal received by the signal input pin In1.

Therein, the connection port C1 also includes a 2D/3D reference voltage pin RP, the time schedule controller 10 also includes a reference voltage output pin op2. Therein, the LED driving unit 20 includes a reference voltage port 22. The reference voltage output pin op2 of the time schedule controller 10 is connected to the reference voltage port 22 via the 2D/3D reference voltage pin RP of the connection port C1.

The time schedule controller 10 controls the reference voltage output pin op2 to output a 2D reference voltage when the signal input pin In1 receives the 2D signal, thereby providing the 2D reference voltage to the reference voltage port 22 of the LED driving unit 20 via the 2D/3D reference voltage pin RP of the connection port C1.

The time schedule controller 10 also controls the reference voltage output pin op2 to output a 3D reference voltage when the signal input pin In1 receives the 3D signal, thereby providing the 3D reference voltage to the reference voltage port 22 of the LED driving unit 20 via the 2D/3D reference voltage pin RP of the connection port C1. Therein, the 3D reference voltage is greater than the 2D reference voltage.

In detail, as shown in FIG. 1, the LED driving unit 20 includes a number of comparator A1, an non-inverting input port (not shown) of each comparator A1 is connected to the reference voltage port 22, an inverting input port (not shown) of each comparator A1 is connected to a end of the resistor R far away from the ground of one corresponding LED string 201. An output port of each comparator A1 is respectively connected to a gate of the NMOSFET Q of one corresponding LED string 201. Therein, the voltage of the end of the resistor R far away from the ground reflects the work voltage of the LED string 201.

Therein, each comparator A1 compares the voltage of the end of the resistor R far away from the ground with the 3D reference voltage or the 2D reference voltage received by the reference voltage port 22, and outputs a digital low signal via the output port to control the NMOSFET Q of the corresponding LED string 201 to turn off, thus achieving over-voltage protection.

Because the 2D reference voltage is less than the 3D reference voltage, then ensuring the electronic device 100 can execute the over-voltage protection even though the electronic device 100 works at the 2D mode.

The LED driving unit also includes a control port 21, the backlight control circuit 1 also includes a switch unit 40. The switch unit 40 is connected between a power pin VP of the connection port C1 and ground, the LED driving unit 20 outputs Pulse-Width Modulation (PWM) signals via the control port 21 to control the switch unit 40 to turn on or off alternately, thus converting the power voltage Vin of the power pin VP to a switching power source signal to power the LED module 20.

In the embodiment, the switch unit 40 is a MOSFET Q1. A gate of the MOSFET Q1 is connected to the control port 21 of the LED driving unit 20, a source of the MOSFET Q1 is connected to the power pin VP of the connection port C1 and the anode input port V+ of the LED module 20, a drain of the MOSFET Q1 is grounded.

In another embodiment, the MOSFET Q and Q1 can be instead by negative-positive-negative bipolar junction transistors.

Therein, the backlight control circuit 1 as shown in FIG. 1 also includes other circuit elements, because them are unrelated to the present invention, the description about them are omitted.

The electronic device 100 can be a mobile phone, a tablet computer, a display, or a television, etc.

Figure 4:
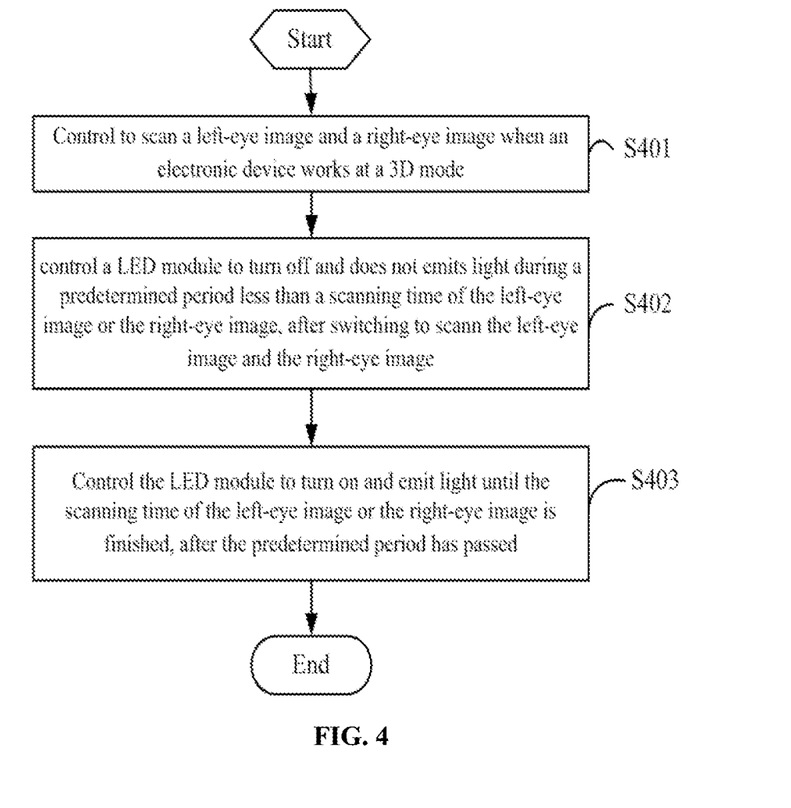
FIG. 4 illustrates a flowchart of a display panel driving method of an embodiment.

Referring to FIG. 4, a flowchart of a display panel driving method of the present invention is illustrated. The display panel driving method is used to drive a LED module 2 to emit light and control the display screen 3 to scan the left-eye image and the right-eye image, when the electronic device works at the 3D mode. At first, the time schedule controller 10 controls the display screen 3 to scan the left-eye image and the right-eye image when the electronic device 100 works at the 3D mode (S401).

The time schedule controller 10 controls the LED module 2 to turn off and does not emits light during a predetermined period less than a scanning time T of the left-eye image or the right-eye image, after switching to scan the left-eye image and the right-eye image (S402). In detail, the time schedule controller 10 controls the backlight control pin op1 to output a backlight control signal with a first voltage to the LED module 2 to control the LED module to turn off and does not emits light.

The time schedule controller 10 then controls the LED module to turn on and emit light until the scanning time T of the left-eye image or the right-eye image is finished, after the predetermined period has passed (S403). In detail, The time schedule controller 10 also controls the backlight control pin op1 to output a backlight control signal with a second voltage to the LED module to control the LED module to turn on and emit light. In a first embodiment, the time schedule controller 10 controls a scanning frequency for scanning the left-eye image or the right-eye image to be N times the scanning frequency of the 2D mode; and scan the left-eye image or the right-eye image N times reputedly during the scanning time T of the left-eye image or the right-eye image; and outputs the backlight control signal to the LED module 2 to control the LED module 2 to turn on and emit light until the scanning time T of the left-eye image or the right-eye image is finished, after the left-eye image or the right-eye image has been scanned M times. In a second embodiment, the time schedule controller 10 controls the scanning frequency for scanning the left-eye image or the right-eye image to be the frequency of the 2D mode, and outputs the backlight control signal with the second voltage to control the LED module 2 to turn on and emit light after the left-eye image or the right-eye image has been scanned the predetermined period, until the left-eye image or the right-eye image has been scanned the scanning time T.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A backlight control circuit, configured to drive a light-emitting diode (LED) module of an electronic device to emit light, comprising a time schedule controller and a LED driving unit, the time schedule controller comprises a display signal output pin, the time schedule controller outputs image signals with a first frequency to a display screen via the display signal output pin to execute a scanning for an image, thus driving the display screen to display the corresponding image, wherein, the time schedule controller further comprises a backlight control pin, the backlight control pin is connected to the LED module;

wherein, when the electronic device is worked at a 3 three-dimensional (3D) mode, and when the time schedule controller switches scanning a left-eye image and a right-eye image, the time schedule controller controls the backlight control pin to output a backlight control signal with a first voltage to the LED module to control the LED module to turn off and does not emits light during a predetermined period less than a scanning time of the left-eye image or the right-eye image; the time schedule controller further controls the backlight control pin to output a backlight control signal with a second voltage to the LED module to control the LED module to turn on and emit light until the scanning time of the left-eye image or the right-eye image is finished, after the predetermined period has passed;

wherein the LED module comprises an anode input port and a plurality of LED strings connected between the anode input port and ground in parallel, each LED string comprises several LEDs and a metal oxide semiconductor field effect transistor (MOSFET) connected between the anode input port and ground in series, the backlight control pin is connected to a drain of the MOSFET of each LED string, the time schedule controller controls the backlight control pin to output the backlight control signal with the first voltage to control the MOSFET of all of the LED strings to turn off, thus the LED module does not emit light; the time schedule controller further controls the backlight control pin to output the backlight control signal with the second voltage to the MOSFET of all of the LED strings to turn on all of the LED strings, thus the LED module emits light.

2. The backlight driving circuit of claim 1, wherein when the electronic device works at the 3D mode, the time schedule controller controls a scanning frequency for scanning the left-eye image or the right-eye image to be a second frequency which is N times the first frequency, thus the left-eye image or the right-eye image would be scanned N times reputedly during the scanning time of the left-eye image or the right-eye image; the time schedule controller outputs the backlight control signal with the first voltage to the LED module to control the LED module to turn off and not to emit light during a period of the left-eye image or the right-eye image is scanned M times which is less than the N times, and then outputs the backlight control signal with the second voltage to the LED module to control the LED module to turn on and emit light after the left-eye image or the right-eye image has been scanned M times, until the scanning time of the left-eye image or the right-eye image is finished.

3. The electronic device of claim 1, wherein the time schedule controller controls the scanning frequency for scanning the left-eye image or the right-eye image to be the first frequency, the time schedule controller outputs the backlight control signal with the first voltage to control the LED module to turn off and not to emit light during the predetermined period less than the scanning time, from starting scan the left-eye image or the right-eye image; the time schedule controller then outputs the backlight control signal with the second voltage to control the LED module to turn on and emit light after the left-eye image or the right-eye image has been scanned the predetermined period, until the scanning time of the left-eye image or the right-eye image is finished.

4. The electronic device of claim 1, wherein control time sequences of all of the LEDs of the LED module are the same.

5. An electronic device, comprising a light-emitting diode (LED) module, a display screen, and a backlight control circuit, the backlight control circuit is configured to drive a light-emitting diode (LED) module of an electronic device to emit light, comprising a time schedule controller and a LED driving unit, the time schedule controller comprises a display signal output pin, the time schedule controller outputs image signals with a first frequency to a display screen via the display signal output pin to execute a scanning for an image, thus driving the display screen to display the corresponding image, wherein, the time schedule controller further comprises a backlight control pin, the backlight control pin is connected to the LED module;

wherein, when the electronic device is worked at a three-dimensional (3D) mode, and when the time schedule controller switches scanning a left-eye image and a right-eye image, the time schedule controller controls the backlight control pin to output a backlight control signal with a first voltage to the LED module to control the LED module to turn off and does not emits light during a predetermined period less than a scanning time of the left-eye image or the right-eye image; the time schedule controller further controls the backlight control pin to output a backlight control signal with a second voltage to the LED module to control the LED module to turn on and emit light until the scanning time of the left-eye image or the right-eye image is finished, after the predetermined period has passed;

wherein the LED module comprises an anode input port and a plurality of LED strings connected between the anode input port and ground in parallel, each LED string comprises several LEDs and a metal oxide semiconductor field effect transistor (MOSFET) connected between the anode input port and ground in series, the backlight control pin is connected to a drain of the MOSFET of each LED string, the time schedule controller controls the backlight control pin to output the backlight control signal with the first voltage to control the MOSFET of all of the LED strings to turn off, thus the LED module does not emit light; the time schedule controller further controls the backlight control pin to output the backlight control signal with the second voltage to the MOSFET of all of the LED strings to turn on all of the LED strings, thus the LED module emits light.

6. The backlight driving circuit of claim 5, wherein when the electronic device works at the 3D mode, the time schedule controller controls a scanning frequency for scanning the left-eye image or the right-eye image to be a second frequency which is N times the first frequency, thus the left-eye image or the right-eye image would be scanned N times reputedly during the scanning time of the left-eye image or the right-eye image; the time schedule controller outputs the backlight control signal with the first voltage to the LED module to control the LED module to turn off and not to emit light during a period of the left-eye image or the right-eye image is scanned M times which is less than the N times, and then outputs the backlight control signal with the second voltage to the LED module to control the LED module to turn on and emit light after the left-eye image or the right-eye image has been scanned M times, until the scanning time of the left-eye image or the right-eye image is finished.

7. The electronic device of claim 5, wherein the time schedule controller controls the scanning frequency for scanning the left-eye image or the right-eye image to be the first frequency, the time schedule controller outputs the backlight control signal with the first voltage to control the LED module to turn off and not to emit light during the predetermined period less than the scanning time, from starting scan the left-eye image or the right-eye image; the time schedule controller then outputs the backlight control signal with the second voltage to control the LED module to turn on and emit light after the left-eye image or the right-eye image has been scanned the predetermined period, until the scanning time of the left-eye image or the right-eye image is finished.

8. A display panel driving method, configured to drive a LED module of an electronic device to emit light and control a display screen of the electronic device to scan a left-eye image and a right-eye image, when the electronic device works at a three-dimensional (3D) mode, wherein the method comprising:

controlling the LED module to turn off and does not emits light during a predetermined period less than a scanning time of the left-eye image or the right-eye image, after switching to scan the left-eye image and the right-eye image; and controlling the LED module to turn on and emit light after the predetermined period has passed;

wherein the LED module comprises an anode input port and a plurality of LED strings connected between the anode input port and ground in parallel, each LED string comprises several LEDs and a metal oxide semiconductor field effect transistor (MOSFET) connected between the anode input port and ground in series, a backlight control pin is connected to a drain of the MOSFET of each LED string, the time schedule controller controls the backlight control pin to output the backlight control signal with the first voltage to control the MOSFET of all of the LED strings to turn off, thus the LED module does not emit light; the time schedule controller further controls the backlight control pin to output the backlight control signal with the second voltage to the MOSFET of all of the LED strings to turn on all of the LED strings, thus the LED module emits light.

9. The method of claim 8, wherein control time sequences of all of the LEDs of the LED module are the same.

10. The method of claim 8, wherein the step of controlling the LED module to turn on and emit light after the predetermined period has passed comprises:

controlling a scanning frequency for scanning the left-eye image or the right-eye image to be N times a scanning frequency of the 2D mode;

scanning the left-eye image or the right-eye image N times reputedly during the scanning time of the left-eye image or the right-eye image; and controlling the LED module to turn on and emit light until the scanning time of the left-eye image or the right-eye image is finished, after the left-eye image or the right-eye image has been scanned M times.

11. The method of claim 8, wherein the step of controlling the LED module to turn on and emit light after the predetermined period has passed comprises:

controlling a scanning frequency for scanning the left-eye image or the right-eye image to be a scanning frequency of the 2D mode; and controlling the LED module to turn on and emit light after the left-eye image or the right-eye image has been scanned the predetermined period, until the left-eye image or the right-eye image has been scanned the scanning time.

* * * * *